April 13, 1965  S. L. JOHNSON  3,178,150
BOTTOM OUTLET VALVE FOR A MIXING VESSEL
Filed July 22, 1963  2 Sheets-Sheet 1
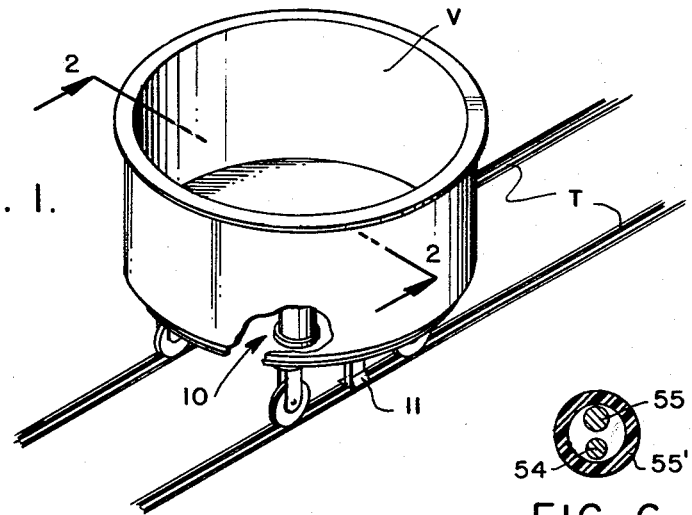
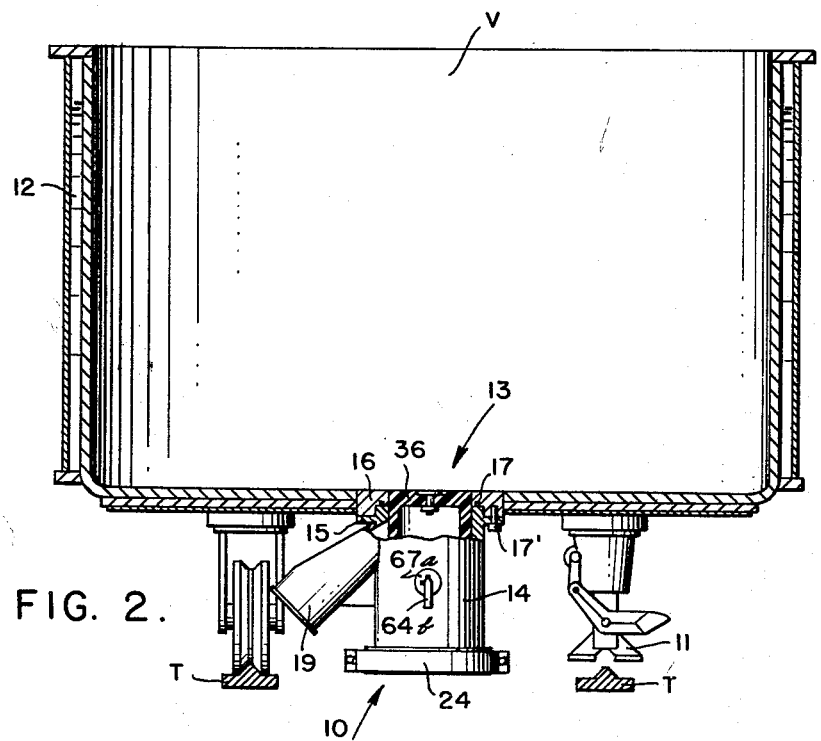
INVENTOR.
STANLEY L. JOHNSON
BY
*P. H. Firsht*
ATTORNEY.

April 13, 1965  S. L. JOHNSON  3,178,150
BOTTOM OUTLET VALVE FOR A MIXING VESSEL
Filed July 22, 1963  2 Sheets-Sheet 2
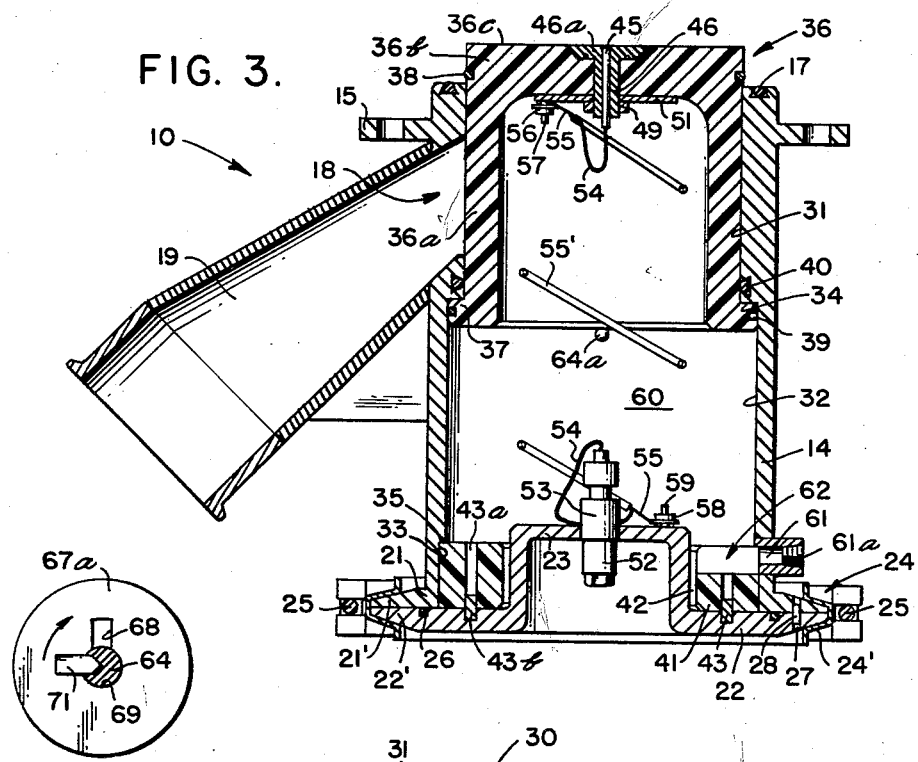
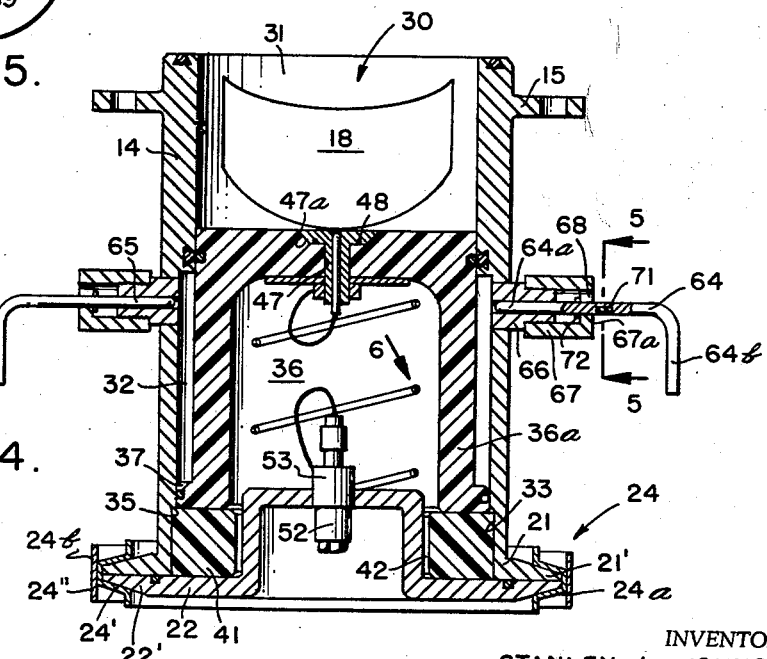
INVENTOR.
STANLEY L. JOHNSON
BY
P. H. Firsht
ATTORNEY.

United States Patent Office 3,178,150
Patented Apr. 13, 1965

3,178,150
BOTTOM OUTLET VALVE FOR A MIXING VESSEL
Stanley L. Johnson, China Lake, Calif., assignor to The United States of America as represented by the Secretary of the Navy
Filed July 22, 1963, Ser. No. 296,873
2 Claims. (Cl. 251—63)
(Granted under Title 35, U.S. Code (1952), sec. 266)

The invention described herein may be manufactured and used by or for the Government of the United States of America for governmental purposes without the payment of any royalties thereon or therefor.

This invention relates generally to improvements in fluid passage closure devices, and more particularly to a new and improved bottom outlet valve for a vessel discharge port.

Those concerned with the development and design of track-mounted ordnance and chemical mixing vessels have long been aware of the need for a practical bottom outlet valve having a functionally large diameter opening, and which will also permit the vessel to retain a low center of gravity to thus aid in reducing inherent hazards encountered in ordnance and chemical mixing operations.

Heretofore, various approaches to this problem have been made using conventional valves of the type employing a stem and packing glands. However, a valve of this type necessarily imposes an undesirable length limitation when designed to have a functionally large diameter valve opening.

When utilizing valves of the aforementioned conventional type, as bottom outlet valves for track or wheel supported vessels, it has been found necessary to elevate the vessels by using wheels having a relatively large diameter, or by elevating the supporting track in order to provide clearance between the vessel and floor surface. Such arrangements serve to increase production costs, and more importantly, serve to raise the vessel's center of gravity and thereby tend to increase the hazards encountered in mixing and transporting ordnance and chemical compounds.

Various attempts have been made to utilize conventional valves of the aforementioned type in the absence of vessel elevation, however, it has been found necessary, due to the valve length, to dispose the vessel's outlet port adjacent one side of the vessel so that a valve having an opening of a desired size may be secured thereto. This arrangement initiates a creation of material entrapping areas which serve to increase the inherent likelihood of detonation, due to an inability to insure a mixing of entrapped material and a lack of proper temperature control.

A further limitation encountered in ordnance mixing vessel design is imposed through the requirement that the valve be so designed as to facilitate rapid cleaning after each and every mixing operation. This necessitates a use of a valve of simple design for permitting an expeditious and complete disassembly, cleaning, and subsequent reassembly.

The general purpose of this invention is to provide an improved remote-controlled outlet valve, having particular utility in the field of ordnance and chemical mixing operations, for overcoming the hereinbefore mentioned disadvantages without imposing additional limitations, and which affords an additional advantage of providng for an efficient mounting of a thermocouple pickup probe near the center of the vessel to thereby increase the efficiency of temperature control during mixing operations. To attain this, the instant invention contemplates a unique arrangement of a vessel bottom outlet port, closure member, valve discharge port, and a closure member activating means, whereby the overall length of the valve is significantly reduced without unduly limiting the ability of the valve to accommodate a rapid discharge of the vessel contents.

Therefore, an object of the present invention is to provide a valve having a functionally large diameter opening and a relatively short over-all length.

Another object is to provide a fluid operated plunger-like closure member of a design which obviates incorporation of a guide stem.

Still another object is to provide a mixing vessel bottom outlet valve which affords the vessel with an uninterrupted interior bottom surface.

A further object is to provide a means for positioning a thermocouple pickup probe near the center of a mixing vessel, which means provide for easy access and a replacement of defective probes.

And yet a further object is to provide a simple valve having a functionally large diameter and a short over-all length, which affords a repeated expeditious disassembly and thorough cleaning thereof, while necessitating a minimum number of replacement components.

Other objects, advantages and novel features of the invention will become apparent from the following detailed description of the invention when considered in conjunction with the accompanying drawings wherein:

FIG. 1 is a partial isometric view of an ordnance mixing vessel having a bottom outlet valve mounted therebeneath;

FIG. 2 is an enlarged cross sectional view of an ordnance mixing vessel, taken generally along lines 2—2 of FIG. 1;

FIG. 3 is an enlarged cross sectional view of the bottom outlet valve of FIGS. 1 and 2, with its reciprocable closure member being shown in its uppermost or extended disposition;

FIG. 4 is an enlarged cross sectional view of the bottom outlet valve of FIGS. 1 and 2, rotated 90 degrees from the view of FIG. 3, with its closure member being shown in its downwardmost or retracted disposition;

FIG. 5 is a cross section, on an enlarged scale, taken generally along lines 5—5 of FIG. 4; and FIG. 6 is a detail view of the components generally designated by the arrow 6 in FIG. 4.

Referring now more specifically to the drawings, wherein like reference characters designate like or corresponding parts throughout the several views, there is shown in FIG. 1 a portable mixing vessel V having mounted therebeneath, a bottom outlet valve, generally designated 10. The vessel V is illustrated as being supported in a conventional fashion by four wheels mounted on a pair of tracks T.

Mounted at the underside of the vessel V, there is a foot operated, friction brake mechanism 11, which is of conventional design, and which may be manually depressed into frictional contact with one of the tracks of the pair T, FIG. 2, to maintain the vessel V in a stationary disposition. The vessel V is further provided with a hot water heating jacket 12 which surrounds the exterior of the vessel V to function as a heating means during ordnance composition mixing operations. Ordinarily, the mixing is accomplished by a set of conventional planetary mixing blades, not shown, which protrude into the vessel and extend to within approximately $\frac{1}{32}''$ of the interior bottom surface of the vessel.

Extending through the center portion of the bottom of the vessel V there is a relatively large port 13, so dimensioned as to accommodate a rapid discharge of mixed ordnance compositions. A discharge of the vessel's contents may be performed at a mixing station, however, as is ordinarily the practice, the discharge is accomplished at a station remote from the mixing station.

The valve 10 is provided with a tubular housing 14, FIG. 2, which is mounted in vertical disposition beneath the vessel V and in a surrounding relationship adjacent the port 13. Any suitable securing means, such as mounting flange 15 formed as a unitary member surrounding the upper end portion of the valve housing 14, may be utilized for mating the housing 14 with a vessel flange 16 and consequently the vessel V. A seated O ring member 17 and a plurality of stud bolts 17' extending through the flange 15 and threaded into the flange 16 serve for securing and sealing the housing 14 to the vessel V.

As a practical matter, it has been found desirable to utilize a stainless steel housing where the valve is utilized in ordnance mixing operations, however, it is contemplated that under certain conditions the housing 14 may be formed of other materials more suited to the particular needs as dictated by the specific operations being performed.

Turning now to FIG. 3, the tubular housing 14 has provided therein, near its upper end, a semi-rectangular valve discharge port 18 extending diagonally upwardly through a side wall to communicate with a hollow interior portion of the housing 14. An elongated conduit 19, having a cross section configuration generally conforming to the size and shape of the port 18, is provided with its innermost end secured to the housing 14, by any suitable means, such as, for example, a welding process, and is so mated with the housing 14 as to establish a continuous uninterrupted discharge surface through the wall of the housing 14 to the conduit's outermost end. The conduit 19 thus serves to provide a means for directing vessel contents from the vessel V into a given container or containers, not shown, and therefore, its length may be varied as found desirable under varying operative conditions.

The vertically disposed housing 14 is also provided with an outwardly disposed unitary flange member 21 being so formed as to be arranged in a surrounding relationship with the lowermost end of the housing 14, FIGS. 3 and 4. The flange 21 is provided with a downwardly tapered or chamfered "V-band" engaging surface portion 21'. A unitary bottom plate 22 having a diameter coextensive with that of the housing 14 and flange 21 is provided for closing and sealing the lowermost end of the housing 14. The bottom plate generally conforms to the shape of a disc and has formed at its outermost peripherial portion an upwardly tapered "V-band" engaging surface 22', which cooperates with the surface 21' to form a wedge-like surface. Near the center of the bottom plate 22 there is provided an inwardly disposed, off-set, thermocouple mounting portion 23, the purpose of which will hereinafter become more clearly set forth.

For securing bottom plate 22 across the lowermost end of the housing 14, a "V-band" quick-disconnect coupling 24 is provided. The "V-band" coupling 24 is of a well-known design, therefore it suffices to understand that the band is, in essence, formed of two semi-circular portions 24a and 24b, FIG. 4, with each portion thereof having an internally directed "V" member 24', and a flat girth member 24". The "V-band" coupling serves to surround and contact the tapered surfaces 21' and 22' for forcing the bottom plate 22 in a direction toward the lowermost end of the housing 14 in a wedging-like manner. A pair of threaded coupling bolts and blocks 25 are connected to mating sections of the portions 24a and 24b for tensioning and thus drawing the member 24' of the "V-band" into wedging contact with the surfaces 21' and 22' and for securing and retaining the "V-band" in its operative position. Furthermore, if desired, an O ring sealing member 26 may be interposed, in an appropriate groove, between the housing flange 21 and bottom plate 22 to thus insure formation of a pneumatic seal as the plate 22 is forced into sealing engagement with the housing 14 by the "V-band" coupling 24.

In order to assure a proper positioning of the bottom plate 22 relative to the housing 14, matching holes 27, FIG. 3, are drilled through the flange 21 and bottom plate 22 so that a dowel pin 28 may be used for aligning and positioning the bottom plate 22. Therefore, it is to be understood that the bottom plate 22 may be quickly removed from the housing 14 to afford access to the housing interior and again readily replaced to its operative position with a minimum expenditure of effort.

Internally, the housing 14 is provided with a longitudinally machined bore 30 extending through the housing and along a longitudinal axis in a vertical direction. The bore 30 is so machined as to create sections or portions 31, 32, and 33 of different dimensioned diameters. The sections 31, 32, and 33 are so formed as to provide the section 31 with a given diameter of a dimension coextensive with a given diameter as provided for the vessel outlet port 13 so that a continuous surface is created for the port 13 which extends into the interior of the valve housing. The section 31 of the bore 30 extends vertically from the uppermost end of the valve 10 to a point substantially below the discharge port 18 and terminates at a shoulder 34, being formed through a junction of section 31 with the section 32 having a diameter somewhat larger htan section 31. Section 32, in turn, extends downwardly and terminates at a second shoulder 35, defined at a junction of section 32 with the section 33, which is provided with still a larger diameter.

The specific lengths of sections 31, 32, and 33 depend primarily on their intended function, which will be more readily understood when described in conqunction with a description of the valve's closure member or reciprocal plunger 36, which is designed to reciprocate along the bore 30 and in contact with the internal walls thereof.

The plunger 36 serves as a closure member and comprises an inverted cup-shaped component having a downwardly directed, hollowed center portion defined by a side wall or skirt 36a. The skirt 36a is of a diameter such that its external surfaces are in sliding contact with the internal surfaces of the bore section 31. The uppermost end of the closure member 36 is closed by a disk-shaped member 36b. The member 36b, preferably, is formed as a unitary member with the side wall or skirt 36a, and is provided with an upwardly facing, external surface 36c, which comprises a fluid flow obstructing surface for obstructing a flow of material ordinarily contained within the vessel V. The diameter of the surface 36c is coextensive with the diameter of the bore section 31, and, consequently, is equal to the diameter of the vessel outlet port 13 so that it may be forced from the bore 30 toward the bottom of the vessel V to thus close or seal the port 13.

At the lowermost end portion of the side walls 36a there is disposed a unitary stop flange 37 extending outwardly and into engagement with the internal surfaces of the bore section 32. The flange 37 operatively engages the shoulder 34 as the plunger 36 moves upwardly so as to limit upward plunger movement toward the vessel outlet port 13. The upward plunger movement is so limited as to project the fluid flow obstructing surface 36c into a common plane with the interior surface of the bottom of vessel V. Thus the fluid flow obstructing surface serves to establish a non-interrupter bottom surface for the vessel V so that the mixer blades may perform a mixing function near the bottom of the vessel. Furthermore, this arrangement obviates an entrapment of materials in the vicinity of the outlet port and thus accommodates an efficient mixing of the materials within the vessel V.

An O ring seal 38 is seated in an appropriately formed groove surrounding the uppermost end portion of the plunger 36, and is so disposed as to provide a seal between the closure member 36 and the port defining surfaces of outlet port 13, when the plunger is fully extended into the port, to thus establish a seal therefor. When the closure member 36 is fully retracted, the O ring 38 is disposed below the port 18 and serves to establish a seal between the internal walls of the bore section 31 and the closure member 36. The closure member or plunger 36 is further provided with a second O ring seal 39, which is seated in a groove formed in the outermost surface of the flange 37 so as to dispose the O ring seal 39 between the internal surface of the bore section 32 and the outermost surface of the flange 37. The O ring seal 39 functions to insure a creation of a pneumatic seal between the flange 37 and the innermost surface of the bore section 31 while permitting a sliding movement to occur therebetween. A third O ring seal 40 is seated in a groove provided in the innermost surface of the bore section 31 and is disposed above the shoulder 34, to thus further insure that a fluid tight or pneumatic seal is established between the bore section 31 and the plunger 36.

For ordnance mixing purposes, it is desirable to machine the closure member 36 as a unitary member from lightweight, noncorrosive dielectric stock having a low coefficient of friction. Therefore, as a practical matter, the closure member 36 may be machined from a material commonly known as Teflon (polytetrafluoroethylene). However, it is to be understood that the specific technique and the material utilized in forming the closure member 36 may be varied according to the dictates of the operation for which the valve is designed.

Extraction of the fluid flow obstructing surface 36c from within the port 13 is effected through a downward retraction of the plunger 36, which is permitted to continue until the surface 36c is withdrawn below the valve discharge port 18 and into a plane formed by the lowermost surface of the port 18 whereupon a fluid communicating passageway is established between the vessel outlet port 13 and the valve discharge port 18.

For limiting downward retraction of the plunger member 36, a stop member 41 is arranged within the bore section 33 and is seated on the bottom plate 22 in a surrounding relationship with the thermocouple mounting portion 23 of the plate 22. For ordnance mixing operations, it has been found desirable to form the stop member 41 of Teflon in order to comply with established safety requirements. The member 41 is so shaped as to generally conform to a "doughnut" configuration, and is provided with an inner diameter significantly larger than the thermocouple mounting portion 23 of the bottom plate 22 to thus provide a fluid passageway 42 between the stop member 41 and the thermocouple mounting portion 23 of the bottom plate. A vertical height or thickness, as provided for the stop member 41, is determined by the desired extent of downward movement to be imparted to the plunger 36, as the plunger 36 will normally seat on the uppermost surface of the stop member 41 when it is fully retracted downwardly from the port 13.

In order to maintain the stop member 41 in a properly oriented disposition, it is provided with an outside diameter coextensive with the internal diameter of the bore section 31 so that the member 41 may extend into the bore section 31 beneath the shoulder 35. It is desirable to provide the bore section 31 with a longitudinal dimension coextensive with the thickness of the stop member 41 so that the shoulder 35 and the bottom plate 22 serve to confine the member 41 in a fixed position relative to the valve's longitudinal axis. In order to maintain the stop member 41 fixed against rotational displacement, a pair of dowel pins 43 are provided and are vertically inserted through a pair of pin-receiving holes 43a, arranged 180 degrees apart within the "doughnut-shaped" stop member 41. A mating pair of holes 43b are likewise provided in the plate 22 so that the pins 43 may extend through the stop member and into the bottom plate. For the sake of convenience, the pins 43 may be secured within either pair of holes 43a and 34b so that the mating holes may be aligned therewith during valve assembly operations. Hence, the stop member 41 is operatively fixed against both longitudinal and rotational displacement within the tubular valve housing 14 and functions as a means for limiting downward reciprocation of the closure member 36 in a manner such as to dispose the flow obstructing surface 36c in a common plane with the lowermost surface of the valve's discharge port 18.

While performing a series of ordnance mixing operations, it is often necessary to maintain the temperature of the ordnance composition at a predetermined level or successive levels during the operations. This imposes a practical requirement that means be provided for constantly determining the temperature of the composition, or vessel contents, during mixing. As a practical matter, it has been found desirable to position a temperature-measuring device, or thermocouple pickup probe, adjacent the center of the vessel V at its interior bottom surface in order to increase the efficiency of the probe's intended function. Hence, the valve of the instant invention must afford means for mounting the thermocouple pickup probe in a manner which is completely compatible with the valve's flow control function, and which will also permit the valve 10 to be properly associated with the vessel V. Therefore, the plunger 36 is provided with an elongated thermocouple pickup probe 45 extending vertically through the member 36b with its uppermost extremity terminating in the plane of the fluid flow obstructing surface 36c so as to communicate with the vessel contents while presenting no obstruction for the mixer blades during mixing operations.

For mounting the probe 45, a T shaped thermocouple probe retainer 46, having a vertical portion terminating at laterally extending portion 46a, is inserted through a retainer receiving hole 47 drilled vertically through the center of the uppermost portion 36b of the plunger member 36. A recessed or countersunk area 47a is provided in the uppermost portion of the member 36b for receiving the retainer's laterally extending portion 46a in a manner such that the uppermost surface of the retainer is disposed in a plane common to the fluid flow obstructing surface 36c. An O ring seal 48 is seated in the lower or inner face of the laterally extending portion 46a of the "T-shaped" retainer 46 so that a fluid tight seal may be established between the fluid flow obstructing surface and the internal portion of the plunger member 36. The body or vertical portion of the retainer 46 is threaded at its lowermost end for receiving a threaded locking nut 49 in order that the retainer 46 may be properly seated and secured in the retainer receiving hole 47 through a tightening of the nut 49 for drawing the retainer 46 downwardly and into a seated and secured position.

As a practical matter, it has been found desirable to dispose an expanded reinforcing plate 51 between the nut 49 and the Teflon material of the plunger member in order to prevent the nut 49 from crushing the material or being pulled upwardly through the hole 47. A similar function is performed at the uppermost end of the retainer 46 by the retainer's lateral portion 46a.

For mating the thermocouple pickup probe 45 with the retainer 46, a vertical bore is formed through the center of the retainer 46 for receiving the probe 45. Silver solder may be utilized as means for securing the probe 45 within the bore of the retainer 46. For connecting the probe 45 with remote temperature measuring equipment, not shown, a thermocouple adapted "quick-disconnect" unit 52 is threaded into and sealed within a sleeve 53 suitably secured and sealed to the thermocouple mounting portion 23 of the bottom plate 22. The unit 52 is connected to the probe 45 by lead wires 54 which are so supported as to afford relative movement between probe 45 and the "quick-disconnect" unit 52. Any suitable means such as a stainless steel spring 55, FIG. 6, and a flexible plastic conduit 55', which surrounds both the lead wires 54 and spring 55 may be provided for supporting the lead wires 54. The spring 55 is secured at its uppermost end through a conventional nut and washer 56 threaded on a post 57 fixed to the reinforcing plate 51.

The spring 55 is similarly secured at its lowermost end to the bottom plate 22 through the use of a nut and washer 58 threaded on a post 59. In addition to serving as a lead wire support, for accommodating reciprocation of the closure member 36, the spring 55 also functions as a "ground-wire" connection for the thermocouple pickup probe 45.

Activation, or reciprocation, of the closure member 36 is effected through establishing alternate fluid pressure variations, with respect to ambient atmospheric pressure, within a pressure chamber 60. The chamber 60 is formed within the bore section 32, and is defined by the internal surface thereof, the hollowed center portion of the members 36 and the bottom plate 22. The pressure chamber 60 thus formed is capable of having its volume alternately increased and decreased for imparting a reciprocation to the plunger 36, since alternate pressures within the chamber 60 serves to force the plunger 36 in opposite directions.

For establishing a desired pressure condition within the chamber 60, to thus impart movement to the plunger member 36, a pressure port 61 extends through a side wall of the tubular housing 14 and into the bore section 33. A suitable fitting 61a is fixed within the port 61 by any suitable means, such as welding, for example. The fitting 61a is connected through a flexible conduit, not shown, to a pressurization and vacuumization source, also not shown. However, it is to be understood that the source includes means of a conventional nature for selectively pressurizing and vacuumizing the chamber 60 to thus raise and lower the plunger member 36 in accordance with a predetermined sequence.

The bottom stop member 41, as hereinbefore described, contacts the inner walls of the bore section 33, therefore, in order to provide a fluid passageway from the port 61 through the stop member 41 to the hollow interior portion of the plunger member 36, particularly when the plunger member is in a retracted position and seated on the stop member, as illustrated in FIG. 3, it is necessary to provide a milled groove or kerf 62 in the uppermost face of the bottom stop member 41. The kerf is of sufficient breadth and depth as to permit an unobstructed fluid flow to be established from the port 61 to the passageway 42 through the stop member 41. Proper alignment of the kerf 62, with respect to the port 61, is achieved through a proper arrangement and alignment of the hereinbefore described dowel pins 43.

Therefore, in operation, as the pressure within the chamber 60 is increased, with respect to ambient atmospheric pressure, through an introduction of a pressurizing fluid through the port 61, the plunger 36 is forced upwardly as the pressure chamber 60 is expanded by the pressure increase occurring within the chamber. Upward displacement of the plunger continues until such time as the stop flange 37 contacts the shoulder 34, at which time the surface 36c is disposed in a fluid flow obstructing position within a plane common to the interior bottom surface of the vessel V, as hereinbefore described. In order to retract the surface 36c of the plunger 36 from the vessel V and position it within a plane common to the lowermost surface of the port 18, the pressure condition within the chamber 60 is alternated through a vacuum introduced by way of the port 61. The plunger member 36 is thus caused to move downwardly under the influence of the vacuum until the flange 37 seats on the stop member 41.

In practice, it is often desirable to fix the plunger member 36 in its uppermost or valve closing position after it has been reciprocated upwardly by an introduction of pressure into the pressure chamber 60. To effect this result a pair of movable and oppositely disposed stems 64 and 65 are provided to be inserted through the wall of the tubular housing 14 and disposed beneath the flange 37 in a plunger supporting fashion. The stems 64 and 65 assume a horizontally disposed L-shaped configuration, and are preferably formed of a stainless steel material. Since the construction and function of each of the stems 64 and 65 are similar, a description of a single stem 64 is deemed sufficient to provide for a clear understanding of their construction and operation.

The L-shaped stem 64 comprises a first portion 64a and a second portion 64b, disposed at approximately 90 degrees with respect to the portion 64a, which serves as a stem operating handle. The portion 64a is mounted for reciprocation in a horizontally disposed sleeve 66. One end of the sleeve 66 is welded to the housing 14 and is so disposed as to have its internal passage communicating with the bore section 32 so that the stem portion 64a may extend into the section. It is to be understood that suitable sealing means are provided for the stem portion 64a in order that the bore section 32 may remain pneumatically sealed, regardless of stem disposition. The opposite or outer end of the sleeve 66 is threaded to receive a hollow guide member 67. One end of the guide member 67 is provided with threads for mating the member with the sleeve 66, while the other end thereof is provided with an integrally formed end closure portion 67a, FIG. 5. The end closure portion 67a of the guide member 67 has formed therein a vertical cam-slot 68 which extends upwardly from a central stem receiving opening 69. The lower surface of the opening 69 serves to centrally support the horizontally disposed stem portion 64a as it is reciprocated into and out of the bore section 32.

Mounted on the stem portion 64a, near its outermost end, FIG. 4, there is a cam 71 normally disposed so as to be opposed by the end closure portion 67a in which the opening 69 and cam-slot 68 are formed. Disposed within the hollow member 67, there is a stem-mounted stop or cam 72, which abuts the end closure portion 67a of the member 67 when the stem 64 is reciprocated or pulled outwardly, and which also serves to abut the outermost end of the sleeve 66 when the stem 64 is reciprocated or pushed inwardly to thus limit stem displacement during reciprocation thereof.

However, in order to reciprocate the stem 64 it is necessary that the cam 71 be rotated clockwise to a position which affords a passing thereof through the cam-slot 68. This is accomplished by applying rotating force to the stem 64 by means of the handle portion 64b. When the cam 71 is thus properly positioned with respect to the cam-slot 68, the stem 64 may be moved inwardly sufficiently to cause the inner end of the stem portion 64a to be inserted beneath the flange 37 when the plunger member 36 is in its uppermost position. Application of a counter-clockwise force to the stem 64 serves to dispose the cam 71 in abutting relationship with the inner surface of the end closure portion 67a of the guide member 67 to thus "lock" the stem 64 at its innermost position, whereby downward displacement of the plunger member 36 may be precluded. It is to be understood that the stems 64 and 65 are to be simultaneously reciprocated in a cooperating "locking" manner to "lock" the plunger 36 in its uppermost position, for maintaining the valve 10 in its "closed" condition, and are to be simultaneously withdrawn from the bore section 32 to thus "unlock" the plunger for accommodating downward displacement thereof to establish an "open" condition for the valve.

In operation, it may be assumed that the vertically disposed valve 10 is in an "open" condition and arranged adjacent to the bottom outlet port 13 of the vessel V so that a fluid flow passageway extends from the vessel V, through the port 13, into the housing 14 and out through port 18 to the outermost end of the conduit 19. The stems or pins 64 and 65 are outwardly withdrawn from the bore 30, and the plunger member 36 is seated on the stop member 41, FIG. 4. A super-atmospheric pressurized condition may now be introduced, through port 61, into the pressure chamber 60. As a pressure increase is experienced, the plunger 36 is slidingly forced upwardly, while being in contact with the interior walls of the bore section 32, until the flange 37 abuts the shoulder 34, whereupon, the fluid flow obstructing surface 36c of the plunger 36 will be disposed in a common plane with the interior bottom surface of the vessel V. The stems 64 and 65 may now be rotated by their handle portions to align their cams with their respective cam-slots so that the stems may be manually forced inwardly and positioned beneath the plunger member 36 in supporting engagement with the flange 37, and then rotated in a counter-clockwise direction for "locking" the plunger 36 with its flow obstructing surface 36c in a sealing disposition to establish a "closed" condition for the valve 10. With the plunger 36 thus "locked," the established pressure may now be removed as "bled-off" through the port 61.

When the valve 10 is to be reverted to its "opened" condition, the stems 64 and 65 are first rotated in a clockwise direction, for aligning the cams 71 with the cam-slot 68, and then withdrawn from the bore 30. While in certain instances the weight of the vessel contents may be relied upon to retract the plunger 36, ordnance mixing operations ordinarily require a rapid discharge of the vessel contents, therefore, it is deemed preferable to establish a sub-atmospheric or vacuumized condition beneath the plunger member 36, in the chamber 60 for thus causing the member 36 to undergo a reverse or reciprocal movement to reseat the flange 37 on the uppermost surface of the stop member 41, whereupon the fluid flow obstructing surface 36c is extracted from the port 13 and disposed in a plane common to the bottom or lowermost surface of the port 18 to thus re-establish an "open" condition for the valve 10.

While the hereinabove described valve is found to be particularly useful in the field of ordnance composition mixing, it is to be understood that the invention may find application in various fields, such as dairy systems and food handling, for example. Furthermore, in many instances it may be desirable to replace the aforedescribed thermocouple pickup system with various other instruments, and, where desired, the stems 64 and 65 may be provided with means for remotely operating the stems for locking the closure member 36 in a desired position.

In view of the foregoing description, it is to be understood that there has been provided a practical valve having a large fluid flow capacity and a relative short overall length, whereby it may be mounted within a limited space.

Obviously many modifications and variations of the present invention are possible in the light of the above teachings. It is therefore to be understood that within the scope of the appended claims the invention may be practiced otherwise than as specifically described.

What is claimed is:

1. In a high-capacity bottom outlet valve of the type adapted to be mounted beneath a mixing vessel having minimum clearance therebeneath, the improvement comprising in combination:
    a vertically arranged tubular housing including a sealed lower end and an open upper end having an effective inside diameter corresponding to the diameter of the outlet port for the mixing vessel, and cylindrical wall surfaces extending vertically between the housing ends;
    means sealing the upper end of said housing to the bottom of vessel in coaxial alignment with said vessel's outlet port;
    means defining a valve discharge opening extending laterally from the interior of said housing near the upper end thereof;
    a cylindrical, reciprocating valve closure member of an inverted-cup configuration having a closed upper end and including a flat upper surface facing said outlet port, with its effective outside diameter corresponding to the inside diameter of the upper end of said housing, and a skirt-like, elongated downwardly extending outer side surface disposed in sealing contact with the wall surfaces of said housing for thereby defining an expandable sealed chamber between the inner surface of said closure member and said sealed lower end of said housing;
    first stop means adapted to limit closure member reciprocating travel to a valve-closed position, wherein the upper surface thereof is extended through said vessel's outlet port and disposed in a common plane with the internal bottom surface of the vessel, and wherein a portion of said side surface of said closure member is caused to sealingly engage the surface of said outlet port, while other portions of said side surface remain in sealing contact with the wall surfaces of said housing for maintaining a sealed condition for said chamber;
    second stop means adapted to limit downward closure member reciprocating travel to a valve-open position, wherein the upper flat surface thereof is laterally aligned with the lower surface of said discharge opening;
    fluid pressurizing means communicating with said sealed chamber adapted to establish a chamber-expanding pressure therewithin for driving said closure member to a valve-closed position, and, subsequently, to establish a chamber-contracting pressure within said chamber for driving said closure member to a valve-open position; and
    valve-locking stems mounted on said housing adapted to be selectively extended into said housing for engaging and maintaining said closure member in a valve-closed position.

2. The combination of claim 1, further characterized in that said lower end is sealed by means comprising:
    a bottom plate mounted across the lowermost end of said housing; and
    a quick-disconnect coupling securing said bottom plate to said housing, so that the plate may be released and removed whereby the closure member may be withdrawn from the housing through the lower end thereof.

References Cited by the Examiner

UNITED STATES PATENTS

| | | | |
|---|---|---|---|
| 1,627,628 | 5/27 | Anderson | 251—63 X |
| 1,808,092 | 6/31 | Wimmer | 137—551 |
| 1,981,938 | 11/34 | Anderson | 285—404 X |
| 2,497,172 | 2/50 | Kean | 285—404 X |
| 2,973,009 | 2/61 | Kazyaka | 251—62 X |
| 3,020,018 | 2/62 | Stram | 251—62 X |
| 3,040,579 | 6/62 | Taylor | 73—359 X |

M. CARY NELSON, *Primary Examiner.*

HENRY T. KLINKSIEK, *Examiner.*